US 8,804,569 B2

(12) United States Patent
Chan

(10) Patent No.: US 8,804,569 B2
(45) Date of Patent: Aug. 12, 2014

(54) MANAGEMENT SESSION INITIATION WITH A CUSTOMER PREMISES DEVICE

(75) Inventor: Frank Chan, Scarborough (CA)

(73) Assignee: BCE Inc., Verdun, Quebec (CA)

( * ) Notice: Subject to any disclaimer, the term of this patent is extended or adjusted under 35 U.S.C. 154(b) by 510 days.

(21) Appl. No.: 12/893,602

(22) Filed: Sep. 29, 2010

(65) Prior Publication Data

US 2011/0022715 A1 Jan. 27, 2011

Related U.S. Application Data

(60) Division of application No. 11/297,463, filed on Dec. 9, 2005, now abandoned, which is a continuation of application No. PCT/CA2004/002186, filed on Dec. 22, 2004, and a continuation-in-part of application No. 11/002,076, filed on Dec. 3, 2004, now abandoned.

(51) Int. Cl.
H04L 12/28 (2006.01)

(52) U.S. Cl.
USPC .......................................... 370/254

(58) Field of Classification Search
None
See application file for complete search history.

(56) References Cited

U.S. PATENT DOCUMENTS

| | | | |
|---|---|---|---|
| 4,935,923 A | 6/1990 | Shimizu et al. |
| 5,023,873 A | 6/1991 | Stevenson et al. |
| 5,285,199 A | 2/1994 | Pocek |
| 5,379,341 A | 1/1995 | Wan |
| 5,623,601 A | 4/1997 | Vu |
| 5,740,075 A | 4/1998 | Bigham et al. |
| 5,917,537 A | 6/1999 | Lightfoot et al. |
| 5,937,201 A | 8/1999 | Matsushita et al. |
| 5,968,116 A | 10/1999 | Day, II et al. |
| 6,151,629 A | 11/2000 | Trewitt |
| 6,249,814 B1 | 6/2001 | Shaffer et al. |
| 6,370,586 B2 | 4/2002 | Davis et al. |
| 6,434,119 B1 | 8/2002 | Wiese et al. |
| 6,480,748 B1 | 11/2002 | Gerszberg et al. |

(Continued)

FOREIGN PATENT DOCUMENTS

| | | |
|---|---|---|
| CA | 2092332 | 8/1997 |
| EP | 1202494 | 5/2002 |

(Continued)

OTHER PUBLICATIONS

CPE WAN Management Protocol, Technical Report TR-069, The DSL Forum, May 2004.*

(Continued)

*Primary Examiner* — Dang Ton
*Assistant Examiner* — Ronald H Davis

(57) ABSTRACT

A communication method for execution at a customer premises device, comprising detecting receipt of a command indicative of an intent of a management entity to initiate a management session, the command being a management session initiation command. Responsive to detecting receipt of the management session initiation command, an identifier for participating in a management session with the management entity is obtained. Also, a method for execution at a management entity, comprising obtaining a management address for a customer device and determining whether the management address is indicative of a an address capable of supporting a management session or an address incapable of supporting a management session. If the management address is indicative of an address incapable of supporting a management session, a command is sent to the customer device, causing it to obtain a management address capable of supporting a management session.

11 Claims, 7 Drawing Sheets

(56) References Cited

U.S. PATENT DOCUMENTS

| | | | |
|---|---|---|---|
| 6,487,197 B1 | 11/2002 | Elliott | |
| 6,584,074 B1 | 6/2003 | Vasamsetti et al. | |
| 6,584,148 B1 | 6/2003 | Zitting et al. | |
| 6,611,519 B1 | 8/2003 | Howe | |
| 6,700,955 B1 | 3/2004 | Davis et al. | |
| 6,775,276 B1 | 8/2004 | Beser | |
| 6,834,311 B2* | 12/2004 | Rao | 709/245 |
| 6,892,229 B1* | 5/2005 | Karadogan et al. | 709/220 |
| 6,944,706 B2 | 9/2005 | Schain et al. | |
| 7,003,574 B1 | 2/2006 | Bahl | |
| 7,035,932 B1 | 4/2006 | Dowling | |
| 7,133,441 B1 | 11/2006 | Barlev et al. | |
| 7,227,933 B1 | 6/2007 | Davis et al. | |
| 7,239,346 B1 | 7/2007 | Priddy | |
| 7,240,102 B1 | 7/2007 | Kouznetsov et al. | |
| 7,254,409 B2 | 8/2007 | Sato et al. | |
| 7,765,316 B1* | 7/2010 | Huckins | 709/232 |
| 2001/0044898 A1 | 11/2001 | Benussi et al. | |
| 2002/0046260 A1* | 4/2002 | Day, II | 709/219 |
| 2002/0064221 A1 | 5/2002 | Yeap et al. | |
| 2002/0093908 A1 | 7/2002 | Yeap | |
| 2002/0099886 A1 | 7/2002 | Emerson et al. | |
| 2002/0105967 A1* | 8/2002 | Chen | 370/465 |
| 2002/0116638 A1 | 8/2002 | Dobes et al. | |
| 2002/0126652 A1 | 9/2002 | Ha et al. | |
| 2003/0053443 A1 | 3/2003 | Owens | |
| 2003/0076833 A1* | 4/2003 | Shin et al. | 370/395.1 |
| 2003/0119507 A1 | 6/2003 | Semper | |
| 2003/0131133 A1 | 7/2003 | Nyu et al. | |
| 2003/0161333 A1 | 8/2003 | Schain et al. | |
| 2003/0233450 A1 | 12/2003 | Carley | |
| 2004/0052268 A1 | 3/2004 | Lewin et al. | |
| 2004/0078341 A1 | 4/2004 | Steichen | |
| 2004/0117852 A1* | 6/2004 | Karaoguz et al. | 725/134 |
| 2004/0187036 A1 | 9/2004 | Nakamura | |
| 2004/0213404 A1 | 10/2004 | Posthuma | |
| 2005/0125519 A1 | 6/2005 | Yang et al. | |

FOREIGN PATENT DOCUMENTS

| | | |
|---|---|---|
| GB | 2364851 | 2/2002 |
| WO | 0002403 | 1/2000 |
| WO | 0044147 | 7/2000 |
| WO | 0186912 | 11/2001 |

OTHER PUBLICATIONS

J. J Rosenberg, et al., STUN-Simple Traversal of User Datagram Protocol (UDP) Through Network Address Translators (NATs), The Internet Society, Mar. 2003.*

IEEE Std 802.3, 2000 Edition, Part 3: Carrier sense multiple access with collision detection (CSMA/CD) access method and physical layer specifications, IEEE, Oct. 16, 2000, pp. 1-4.*

J. Mogus, Internet Subnets, RFC 917, The Internet Society, Oct. 1984.*

Office Action mailed on Dec. 14, 2009 in connection with U.S. Appl. No. 11/297,643, 29 pages.

Office Action mailed on Dec. 9, 2009 in connection with U.S. Appl. No. 11/002,076, 29 pages.

Office Action mailed on Feb. 22, 2010 in connection with Canadian Patent Application 2,454,408, 2 pages.

Office Action mailed on Jul. 8, 2010 in connection with U.S. Appl. No. 11/297,463, 35 pages.

Office Action mailed on Jul. 8, 2010 in connection with U.S. Appl. No. 11/002,076, 31 pages.

Office Action mailed on Jun. 12, 2009 in connection with U.S. Appl. No. 11/297,463, 3 pages.

Office Action mailed on Mar. 15, 2010 in connection with Canadian Patent Application 2,549,879, 8 pages.

Office Action mailed on Mar. 24, 2009 in connection with Canadian Patent Application 2,454,408, 3 pages.

Office Action mailed on Mar. 4, 2009 in connection with U.S. Appl. No. 11/297,463, 39 pages.

Office Action mailed on May 14, 2009 in connection with U.S. Appl. No. 11/002,076, 26 pages.

Office Action mailed on Oct. 20, 2008 in connection with U.S. Appl. 11/002,076, 24 pages.

Office Action mailed on Oct. 3, 2008 in connection with U.S. Appl. No. 11/297,463, 32 pages.

Office Action mailed on Dec. 6, 2010 in connection with U.S. Appl. No. 11/002,076, 33 pages.

Office Action mailed on May 26, 2011 in connection with U.S. Appl. No. 11/002,076, 21 pages.

* cited by examiner

| CUSTOMER IDENTIFIER | MANAGEMENT ADDRESS | TYPE (NORMAL OR WAKE-UP) |
|---|---|---|
| 8 | | |
| 10A | | |
| 10B | | |
| ... | | |
| | | |
| | | |

FIG. 4

MANAGEMENT SESSION INITIATION WITH A CUSTOMER PREMISES DEVICE

CROSS-REFERENCE TO RELATED APPLICATIONS

The present application is a DIVISIONAL, and claims the benefit under 35 U.S.C. §120 of, U.S. patent application Ser. No. 11/297,463, filed on Dec. 9, 2005 now abandoned, which is itself both (i) a Continuation of PCT patent application Serial No. PCT/CA2004/002,186 to Frank Chan, entitled "Management Session Initiation With A Customer Premises Device", filed on Dec. 22, 2004, designating the United States and (ii) a Continuation-In-Part of U.S. patent application Ser. No. 11/002,076 to Frank Chan, entitled "Subscriber Station", filed on Dec. 3, 2004 now abandoned. The aforementioned patent applications are hereby incorporated by reference herein.

FIELD OF THE INVENTION

The present invention relates generally to the field of telecommunications and, in particular, to methods and systems for initiating management sessions with customer premises devices.

BACKGROUND

Solving the "last-mile" problem has been an important part of providing ubiquitous, high-speed Internet access to business and residential customers ("subscribers") at their premises. Digital Subscriber Line ("DSL") and CATV Internet services are now well-entrenched means of solving the last-mile problem. A common feature of last-mile solutions is a switching station that has a gateway connected to the Internet via a backhaul, such as T1, T3, a virtual network or the like. The gateway interfaces the backhaul with the particular communication medium or channel used to deliver the Internet service to the subscriber premises.

In DSL (and its variants, commonly referred to xDSL), the switching station is typically a central office as commonly found in the public switched telephone network ("PSTN"), and the gateway is a Digital Subscriber Line Access Multiplexer ("DSLAM"). The communication medium is typically the traditional twisted pair of copper wires that run between the central office and subscriber premises, and normally connect to a plain old telephone service ("POTS") telephone in the subscriber premises. Where the subscriber is a DSL customer, the twisted pair of copper wires in the customer premises are also connected to a DSL modem, which in turn connects to the subscriber's computer. A data communication session can thus established between the subscriber's computer and a desired location on the Internet.

Problems with the foregoing arise when a subscriber loses, or believes to have lost, Internet connectivity. To troubleshoot this problem, it is common for the service provider to send a service technician to the subscriber premises. To verify Internet connectivity, the service technician can attempt to make their own Internet connection from the subscriber premises in order to assess whether a connectivity problem actually exists, and if so, to attempt to determine the nature of the problem. However, such use of service technicians can be wasteful, particularly where the technician discovers that no connectivity problem exists and that the subscriber's problems are in fact related to the subscriber's proprietary equipment, or other equipment located at the subscriber's premises.

With a view to overcoming these difficulties, the concept of a "management session" has arisen. The purpose of a management session is to troubleshoot a subscriber's modem from a conveniently located customer service center, thus eliminating the need to dispatch a service technician to the modem site. Such management sessions are typically run in parallel with the data communication session, and provide continuous monitoring of the modem in question.

However, a concern with the concept of a persistent (or "always-on") management session is the consumption of resources inside the modem needed to operate the management session, as well as the network resources necessary to maintain such session. Another concern with persistent management sessions is the creation of security loopholes. Specifically, a malicious individual interested in "fooling" the modem into believing that she/he is at the customer service center can study the behaviour of the communications exchanged during the management session and learn the appropriate messages to be used. As a result, malicious individuals can hack into residential modems and invade customer privacy.

Against this background, there is a need for improved techniques in the management of modems and other customer premises devices.

SUMMARY OF THE INVENTION

The present invention may be summarized according to a first broad aspect as a communication method for execution at a customer premises device. The method comprises detecting receipt of a command indicative of an intent of a management entity to initiate a management session, the command being a management session initiation command and, responsive to detecting receipt of the management session initiation command, obtaining an identifier for participating in a management session with the management entity.

The present invention may be summarized according to a second broad aspect as a customer premises device, comprising means for detecting receipt of a command indicative of an intent of a management entity to initiate a management session, the command being a management session initiation command; and means for obtaining an identifier for participating in a management session with the management entity in response to detecting receipt of the management session initiation command.

The present invention may be summarized according to a third broad aspect as a data signal embodied in a carrier wave readable by a computing system and encoding instructions for performing a method at a customer premises device, the method comprising: detecting receipt of a command indicative of an intent of a management entity to initiate a management session, the command being a management session initiation command and, responsive to detecting receipt of the management session initiation command, obtaining an identifier for participating in a management session with the management entity.

The present invention may be summarized according to a fourth broad aspect as a communication method, comprising: at a first customer premises device, establishing a first management session with a management entity; the first customer premises device sending to a second customer premises device a command indicative of an intent of a management entity to initiate a second management session with the second customer premises device; responsive to detecting receipt of the command, the second customer premises device obtaining an identifier for participating in the second management session with the management entity.

The present invention may be summarized according to a fifth broad aspect as a method for execution at a management entity, comprising obtaining a management address for a customer device; determining whether the management address is indicative of an address capable of supporting a management session or an address incapable of supporting a management session; and, if the management address is indicative of an address incapable of supporting a management session, sending a command that causes the customer device to obtain a management address capable of supporting a management session.

The present invention may be summarized according to a sixth broad aspect as a data signal embodied in a carrier wave readable by a computing system and encoding instructions for performing a method at a management entity, the method comprising: obtaining a management address for a customer device; determining whether the management address is indicative of an address capable of supporting a management session or an address incapable of supporting a management session; and, if the management address is indicative of an address incapable of supporting a management session, sending a command that causes the customer device to obtain a management address capable of supporting a management session.

The present invention may be summarized according to a seventh broad aspect as a system for establishing management sessions with customer devices, comprising: a management entity; an address server that maintains management addresses for respective ones of the customer devices; the management entity being operative for: querying the address server to obtain a management address for a particular one of the customer devices; determining whether the management address is indicative of an address capable of supporting a management session or an address incapable of supporting a management session; and, if the management address is indicative of an address incapable of supporting a management session, sending a command that causes the particular customer device to obtain a management address capable of supporting a management session.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 4 depicts a table maintained by an address server in FIG. 2;

DETAILED DESCRIPTION OF EMBODIMENTS

Figure 1:
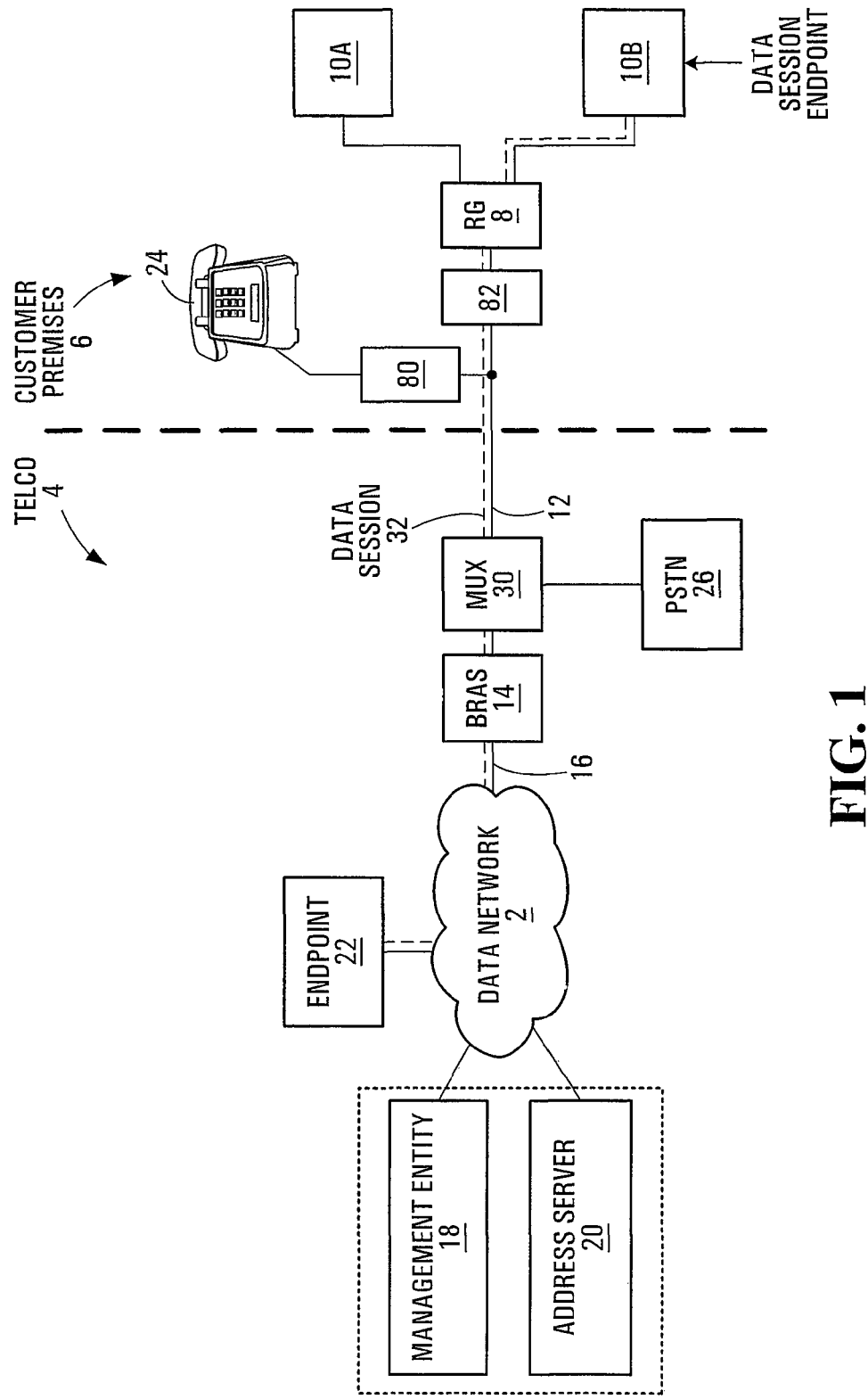
FIG. 1 depicts a network architecture for delivering a data service to a customer premises device.

FIG. 1 depicts a network architecture comprising a plurality of entities involved in delivering a telecommunications service to a customer of a telephone company (telco) 4. In one specific non-limiting embodiment, the telecommunications service may be access to a data network 2, which may comprise the Internet, without being limited thereto. In other non-limiting embodiments, the telecommunications service may be voice-over-packet telephony, while in still other cases, the telecommunications service may be the delivery of a digital television signal from a remote broadband source. At the customer premises 6, there is provided a residential gateway (RG) 8 which is connected to one or more appliances 10A, 10B such as a set top box (STB), an analog terminal adapter (ATA), a personal computer (PC), and so on. An in-home network may be used to interconnect the various appliances 10A, 10B to each other and/or to the RG 8.

The RG 8 exchanges signals with the telco 4 over a communication link 12. In the embodiment illustrated in FIG. 1, the communication link 12 is a standard copper twisted pair cable used customarily for telephony signals, while the signal being exchanged over the communication link is one which allows telephony-band signals and out-of-telephony-band signals to coexist. A non-limiting example of a general class of signals meeting these requirements is a digital subscriber line (DSL) signal. However, it should be understood that the nature of the communication link 12 and the format of the signal being exchanged over the communication link 12 is immaterial to the present invention. For example, in other embodiments, the communication link 12 may very well be a coaxial cable, an optical fiber or a wireless link. In the specific example of a wireless link, any modulation or transmission method could be used, including but not limited to code division multiple access (CDMA), 802.11, 802.16, Evolution Data Only (EvDO), Global System for Mobile Communications (GSM), and so on.

The network architecture of FIG. 1 also provides a broadband remote access server (BRAS) 14, which is basically a computing device acting as a gateway to the data network 2 for the customer. That is to say, the BRAS 14 is the initial point of contact for the RG 8 when accessing the data network 2. The BRAS 14 is connected to the data network 2 by a high-speed data link 16. The data network 2 itself leads to a variety of other servers and network entities. Shown in FIG. 1 are three such entities, namely a management entity 18, an address server 20 and a potential data session end point 22 (such as a web server or another BRAS). The role of each of these components will become apparent later on in this specification.

Since the BRAS 14 potentially serves a large number of customers, the signal exchanged between the BRAS 14 and the customer premises 6 may undergo multiplexing at one or more multiplexing stages 30 before being sent onto the communication link 12. An example of an architecture having a plurality of multiplexing stages 30 is one in which a first set of multiplexers is located at a central office or in proximity to the BRAS 14, with a second set of multiplexers being located deeper within the distribution infrastructure (e.g., on a street corner). One or more of these multiplexers may comprise a Digital Subscriber Line Access Multiplexer (DSLAM), which is a known device that links multiple customer DSL connections to a single high-speed line.

In the illustrated embodiment, the management entity 18 and the address server 20 are shown as being connected to the BRAS 14 via the data network 2. However, it is envisaged that in other embodiments, either or both of the management entity 18 and the address server 20 could be connected directly to the BRAS 14 or may bypass the BRAS 14 and connect directly into one of the multiplexing stages 30.

Assuming that the signal being exchanged over the communication link 12 has a telephony-band portion and an out-of-telephony-band portion, the customer premises 6 may be equipped with a splitter, which sends the received signal to both a telephone 24 and a modem 82 at the customer premises 6. A filter 80 connected to the telephone 24 may provide filtering of the received signal, so that only the telephony-band portion reaches the telephone 24. Analogously, a filter (not shown) in the modem 82 may provide filtering of the received signal, so that only the modem 82 attempts demodulation of only the out-of-telephony-band portion. The modem 82 outputs a demodulated signal to the RG 8, which comprises various hardware and software, as well as an interface. This interface exchanges digital data with the appliances 10A, 10B in a suitable format, such as Ethernet, WiFi, etc. Individual data streams can be exchanged with individual appliances 10A, 10B on a point-to-point basis or via the in-home network described above.

In the opposite direction of travel, when a signal is received at one of the multiplexing stages 30, a splitter similar to the splitter at the customer premises 6 separates the telephony-band portion from the out-of-telephony-band portion. The telephony-band portion of the received signal is sent to the public switched telephone network (PSTN) 26, while the out-of-telephony-band portion of the received signal is processed by a modem, multiplexed with other processed out-of-telephony-band portions of other received signals, formatted (e.g., into an ATM signal) and sent to the BRAS 14.

Given the architecture described above, it is possible to establish data sessions between users of the appliances 10A, 10B and entities in the data network 2. For example, let the appliance 10B be a personal computer (PC) and let the potential data session end point 22 be a Web server. In this case, a data session 32 may be established between the PC 10B and the Web server 22 in order to allow a user of the PC 10B to exchange content with the Web server 22, with the telco 4 acting as the Internet service provider. It should be understood that the term "data session" as used herein is not limited to the exchange of a particular type of information, but rather is used to distinguish such a session from a "management session" as described herein below. The data session 32 may actually comprise an exchange of voice, video, email, computer files, text messages, etc., or any combination thereof. Moreover, the data session 32 may be established and maintained using a number of protocols residing at layer 3 or higher of the OSI model, including but not limited to Internet Protocol (IP), Internet Control Message Protocol (ICMP), Simple Object Access Protocol (SOAP), Transmission Control Protocol (TCP), User Datagram Protocol (UDP) and Hypertext Transfer Protocol (HTTP), for example.

Figure 2:
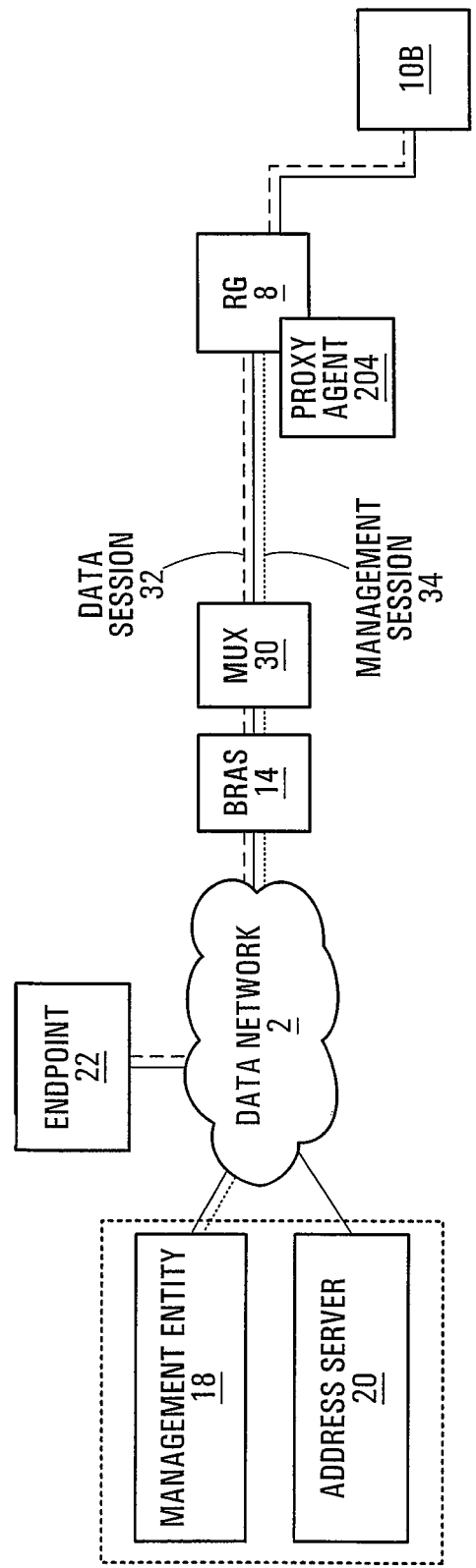
FIG. 2 depicts a management session between a management entity and a proxy agent residing in the customer premises device, in accordance with an embodiment of the present invention.

In accordance with an embodiment of the present invention, and with reference now to FIG. 2, a "management session" 34 can be established between the management entity 18 and a "device to be managed". The management session 34 is useful for troubleshooting and other purposes, and is separate from the aforementioned data session 32 that may be ongoing between the data session endpoints (in this case 10B and 22). In this particular example, the "device to be managed" is the RG 8, although it is within the scope of the invention for the "device to be managed" to be located elsewhere (e.g., deeper) within the customer premises 6.

Further detail regarding the functionality of the management entity 18 and the RG 8, which enable eventual establishment of the management session 34, is now given with additional reference to FIGS. 3-6. The underlying assumption is that the management entity 18 is desirous of establishing a management session with the RG 8. The RG 8 is known to the management entity 18 by a "customer identifier", examples of which include but are not limited to a global user identifier (GUID), MAC-ID, serial number, etc. However, despite knowing the customer identifier of the RG 8, the management entity 18 does not yet know how to address messages destined for the RG 8, and the mere use of the customer identifier of the RG 8 might not be recognized by other entities whose participation is needed in order to route messages to the RG 8.

Figure 3:
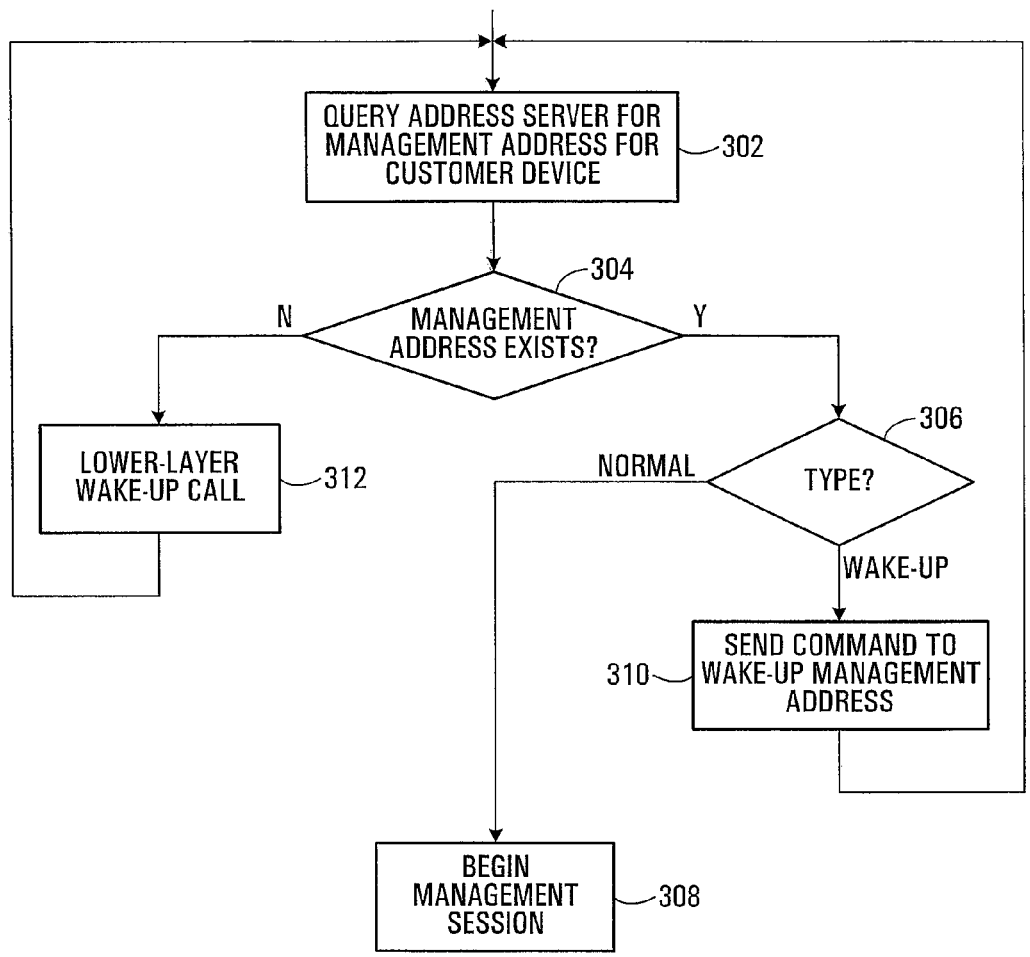
FIG. 3 is a flowchart representative of steps executed by the management entity in FIG. 2.

Accordingly, reference is now made to FIG. 3, which shows a flowchart indicative of the decision logic executed by the management entity 18. At step 302, the management entity 18 queries the address server 20 for a "management address" of the RG 8. A "management address" can be one of two types, namely "normal" or "wake-up". This is now described with reference to FIG. 4, which shows a table 400 that is maintained by the address server 20. Specifically, the table 400 stores a plurality of records corresponding to different customer devices, each indexed by the aforementioned "customer identifier" of the corresponding customer device. The record pertaining to a given customer device will include an entry for a management address, as well as an entry for indicating the type of management address (i.e., either "normal" or "wake-up"). When the management entity 18 queries the address server 20, the management entity 18 supplies the customer identifier of the RG 8, while the address server 20 returns the management address, if any, as well as the type of management address.

The similarities and differences between a normal management address and a wake-up management address will now be described.

Both a normal management address and a wake-up management address refer to addresses which can be used by the management entity 18 in order to reach the device to be managed (in this case, the RG 8) using a higher-layer protocol, which may reside at layer 3 or higher of the OSI model. Examples of a suitable higher-layer protocol include but are not limited to IP, ICMP, SOAP, TCP, UDP and HTTP.

If the management address of the customer premises device stored by the table 400 is a "normal" management address, this means that the customer device is currently capable of supporting a management session with the management entity 18. Stated differently, a normal management address signifies an address that the RG 8 uses for conducting management sessions, and which is independent of any data session (such as data session 32) that may be supported by the RG 8. For example, if the RG 8 participates in the data session 32 using a certain IP address, its normal management address may be another IP address, which will be different from this certain IP address.

On the other hand, if the management address of the customer premises device stored by the table 400 is a "wake-up" management address, this means that the customer premises device 6 is currently incapable of supporting a management session with the management entity 18. Stated differently, a wake-up management address signifies an address that the RG 8 is using for other activities (such as supporting the data session 32), and which can therefore be used to reach the RG 8 to convey a simple message (such as a trigger), but which is not intended to be used for conducting more involved management activities. In fact, the wake-up management address is used to trigger the RG 8 to acquire a normal management address.

Figure 5:
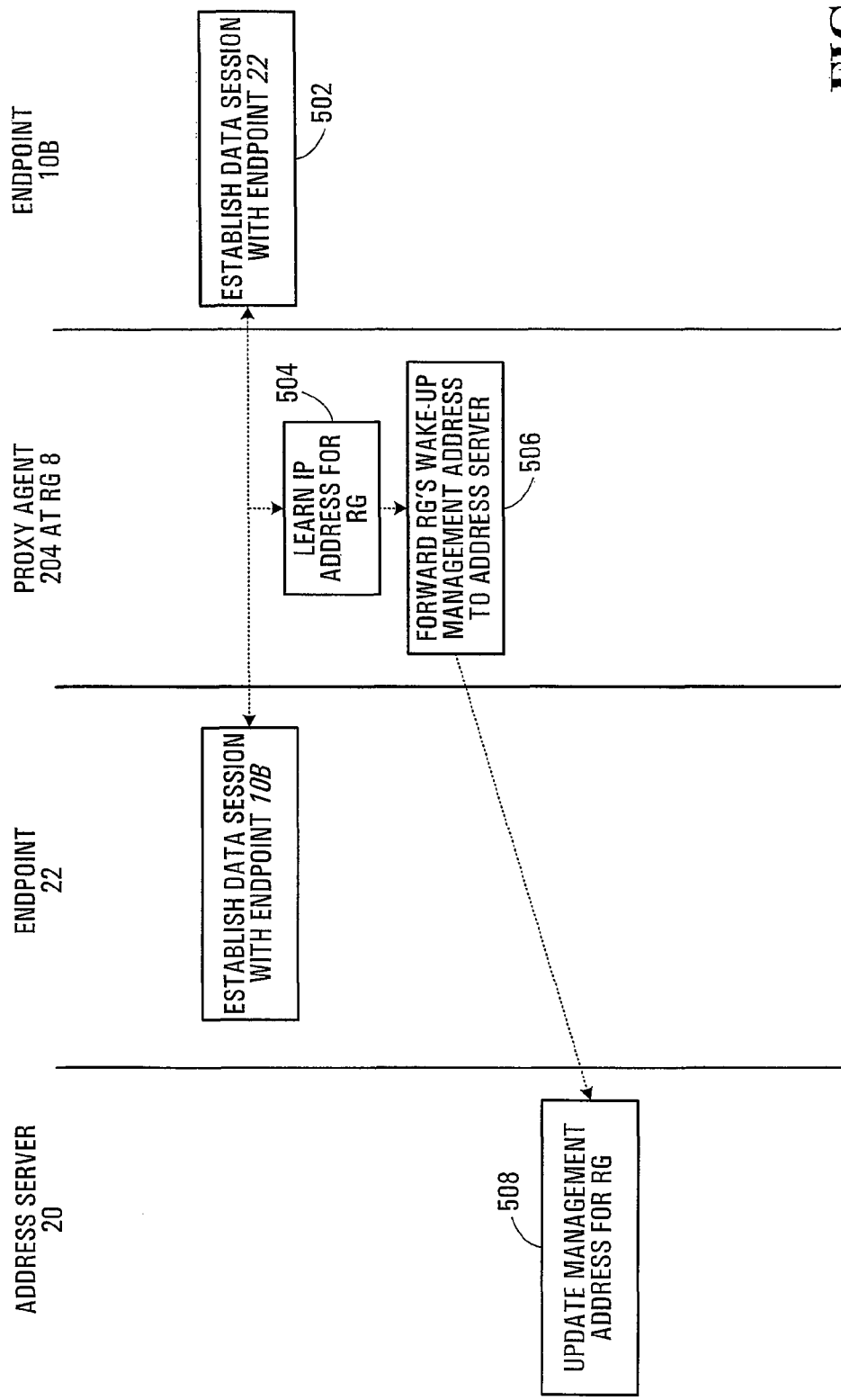
FIG. 5 is a flowchart representative of steps executed by the proxy agent in FIG. 2 when acquiring a wake-up management address.
Figure 6:
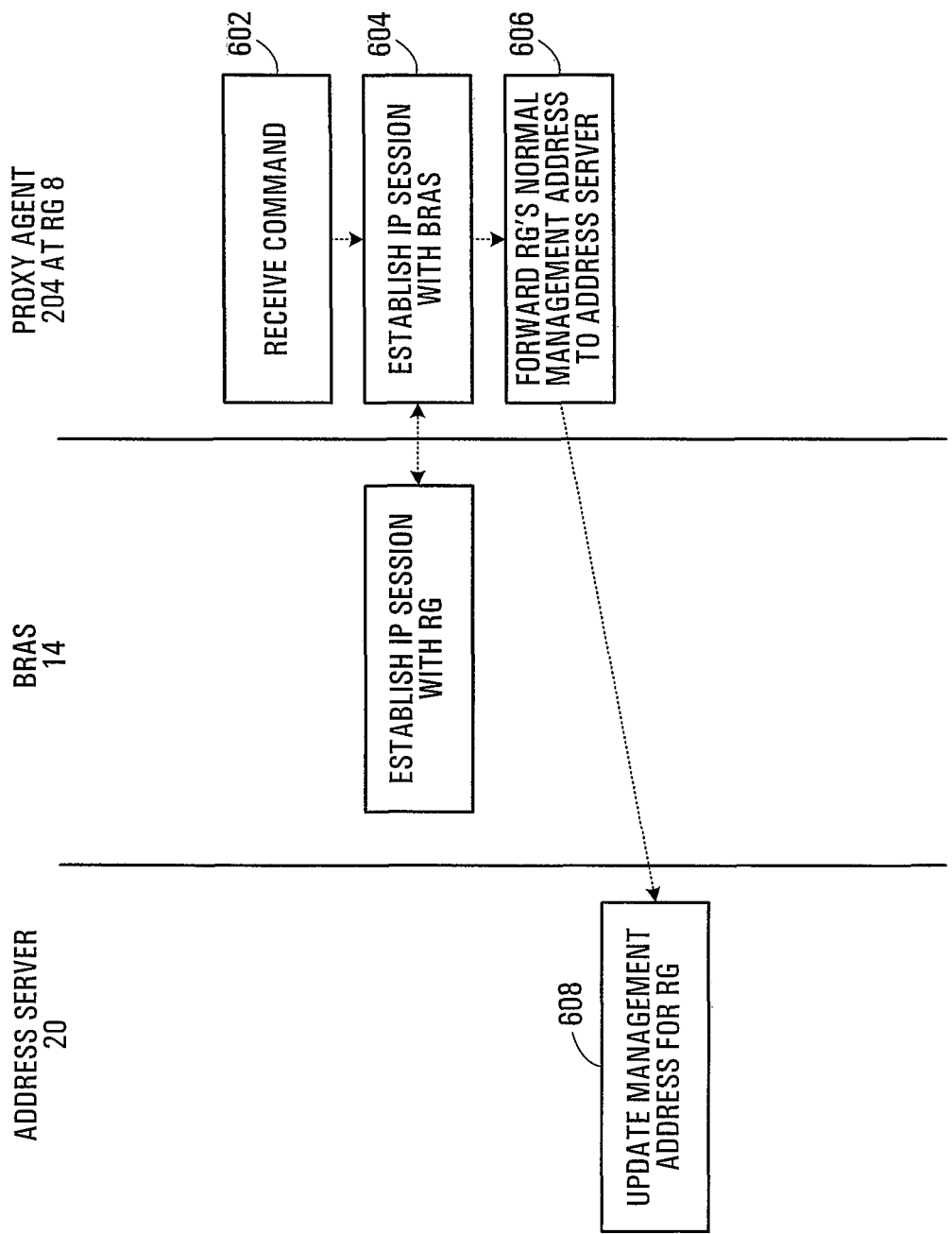
FIG. 6 is a flowchart representative of steps executed by the proxy agent in FIG. 2 when acquiring a normal management address.

The manner in which the RG 8 becomes associated with a wake-up management address is now described with reference to FIG. 5. Specifically, let there be a data session 32 (see step 502) between data session endpoints 10B and 22, via the RG 8. The role of the RG 8 in this data session 32 may be to provide functionality such as network address translation, packet filtering, firewall, etc. In any event, for the purposes of the data session 32, the RG 8 will be associated with an address (e.g., an IP address) to which packets are sent, and from which these packets are forwarded, in the course of the data session 32. At step 504, a proxy agent 204 running in the RG 8 learns this IP address and, at step 506, the proxy agent 204 transmits it to the address server 20 (see step 506), where the IP address is stored in the table 400 as the "wake-up" management address for the RG 8 (see step 508). Knowledge of the RG's wake-up management address will allow the management entity 18 to reach the RG 8 even though there is no management session yet established between the management entity 18 and the RG 8.

Returning now to the flowchart in FIG. 3, at step 304, the management entity 18 determines whether the address server 20 has indeed returned some type of management address for the RG 8. If the answer is YES, then the management entity 18 proceeds to step 306, where the type of management address is ascertained. If the management address is a "normal" management address, then the management entity 18 knows the address to which it can send management-related information in view of establishing the management session 34. In this case, the management entity 18 proceeds to step 308, where a higher-layer management session 34 can be immediately established if desired.

However, if the management address is found to be a "wake-up" management address, then the management entity 18 knows where it can reach the RG 8, but also knows that the RG 8 is not yet ready to exchange management-related information with the management entity 18. To this end, the management entity 18 proceeds to step 310, where the management entity 18 sends a command indicative of the management entity's intent to initiate a management session. This command, hereinafter referred to as a "management session initiation command" may be sent using a higher-layer protocol (e.g., IP, ICMP, SOAP, TCP, UDP, HTTP, etc.), since the RG 8 is known to be reachable using such higher-layer protocol (viz., at its wake-up management address). After sending the management session initiation command to the RG 8 using the higher-layer protocol, the management entity 18 returns to step 302, where it continues querying the address server 20, until it has finally received an indication that the RG 8 is associated with a normal management address.

It should be mentioned that if step 304 led to the determination that no management address of any kind is associated with the RG 8, then the management entity 18 proceeds to step 312. This situation may arise if the RG 8 cannot be reached using a higher-layer protocol. In these circumstances, it may be suitable for the management entity 18 to attempt to communicate with the RG 8 using a lower-layer protocol (e.g., layer 1 or layer 2) in order to issue a management session initiation command. An example of the form of a lower-layer management session initiation command includes resetting, in accordance with a particular reset pattern (e.g., a predetermined number of times, within a predetermined time interval), a line card in one of the multiplexing stages 30 that is used to communicate with the RG 8. This can be referred to as a reset pattern. A more detailed description of the issuance of lower-layer commands is provided in the aforementioned U.S. patent application Ser. No. 11/002,076, filed on Dec. 3, 2004, entitled "Subscriber Station" and hereby incorporated by reference herein.

After sending the management session initiation command to the RG 8 using the lower-layer protocol, the management entity 18 returns to step 302, where it continues querying the address server 20, until it has finally received an indication that the RG 8 is associated with a normal management address.

At this point in the description, it may be useful to describe for the reader's benefit how the RG 8 acquires a normal management address upon receipt of the aforementioned "management session initiation command". It will be recalled that such a command may be sent to the RG 8 by the management entity 18 using a lower-layer protocol (the NO branch of step 304) or a higher-layer protocol (the WAKE-UP branch of step 306). The actions of the RG 8 will now be described with reference to FIG. 6. It will be appreciated that the activities of the RG 8 may be performed by the proxy agent 204 in the RG 8. The proxy agent 204 is a functional entity that may be implemented in hardware and/or software, as appropriate.

At step 602, the proxy agent 204 receives and recognizes the aforementioned management session initiation command from the management entity 18. To this end, in order to detect a lower-layer command, for example, the modem 82 in the RG 8 may be equipped with suitable hardware, software and/or control logic for detecting a reset pattern of a line card used inside one of the multiplexing stages 30 to communicate with the modem 82. Alternatively, to detect specific information in a packet header or payload, the RG 8 may be equipped with an application layer gateway (ALG) or a stateful packet filter (SPF), with each packet arriving along the communication link 12 being read and interpreted by the proxy agent 204.

At step 604, the proxy agent 204 responds to receipt and recognition of the management session initiation command by establishing an initial session (e.g., an IP session) with the BRAS 14. The proxy agent 204 knows where to reach the BRAS 14 by consulting an internal table where the location information of the BRAS 14 is kept. As part of the establishment of the initial session with the BRAS 14, the RG 8 is assigned an IP address. At step 606, the proxy agent 204 forwards this IP address to the address server 20, along with (I) the customer identifier of the RG 8; and (II) an indication that the IP address is to be used as the normal management address for the RG 8. At step 608, the address server 20 stores the received information in the appropriate entries in the table 400.

In addition, the proxy agent 204 may transmit to the address server 20 other information regarding the initial session established with the BRAS 14. Also, the proxy agent 204 may transmit to the address server 20 a "validity time limit" associated with the IP address, which may be stored by the address server 20 in an additional field of the record associated with the RG 8. This "validity time limit" may be used to specify a maximum amount of time during which the address server 20 is to maintain the normal management address for the RG 8. Such a measure enhances security, since it prevents the establishment of a new management session (which may be false) on the basis of old information. In the absence of a specific validity time limit forwarded by the proxy agent 204 in the RG 8, the address server 20 may itself impose a default validity time limit whenever it receives a normal management address from a customer device (such as the RG 8).

The above example has shown how a "management session" 34 can be established between the management entity 18 and the RG 8 at the customer premises 6. For this purpose, a management session initiation command is used to convey the management entity's intent to initiate the management session 34. The ensuing management session 34 is useful for troubleshooting and other purposes, and is separate from the data session 32 that may or may not be ongoing between the data session endpoints (in this case 10B and 22).

It will also be apparent that the management entity 18, which issues the management session initiation command, might be separated from the RG 8 (and from the "device being managed") by a data network 2. The management session initiation command causes the device being managed to acquire a normal management address, which is then used for management-related communications. Hence, the absence of lower-layer access to the device being managed does not preclude triggering a management session with that device.

It should be appreciated that the device being managed may be the RG 8 itself or a device that is deeper within the customer premises 6. Accordingly, assume that a management session is to be established between the management entity 18 and a device that is deeper within the customer premises 6 than the RG 8. In this embodiment, a revised table in the address server 20 stores information not only regarding the device to be managed, but also regarding the RG to which that device is connected. Thus, for example, in respect of the PC 10B, the revised table in the address server 20 would maintain a record comprising (I) a field for the management address of the PC 10B; (II) a field for the type of management address of the PC 10B; and (III) a field for the customer identifier of the associated RG 8.

Meanwhile, a proxy agent running in the PC 10B listens for an IP address being used by the PC 10B in the course of conducting sessions with the outside world, and transmits this address to the address server 20 as its wake-up management address. However, it will be noted that when the PC 10B communicates its wake-up management address to the address server 20, this will be done through the RG 8. Therefore, on the way, the packets will be encapsulated by the RG 8 (running a process called network address translation—NAT) and a new header will be placed on them. Thus, the address server 20 will gain knowledge of the RG 8 associated with the PC 10B by reading the headers of the received packets, while it will gain knowledge of the management address information about the PC 10B by reading the payloads of the received packets. This allows the address server 20 to complete the record corresponding to the PC 10B in the revised table.

Now, consider that the management entity 18 wishes to establish a management session with the PC 10B. Firstly, the management entity 18 provides the customer identifier of the PC 10B to the address server 20, which then consults the revised table and obtains the management address of the PC 10B and the customer identifier of the RG 8. Clearly, there are a number of possibilities, which result in different courses of action by the management entity 18.

A first possibility is that the PC 10B will have a normal management address associated with it. The management entity 18 then begins a management session by sending packets destined for the PC 10B via the RG 8. Since the RG 8 is running NAT, the PC 10B behind the RG 8 will be reachable using a non-routable IP address that is internal to the LAN at the customer premises 6.

A second possibility is that the PC 10B will have a wake-up management address, which may correspond to the IP address currently being used by the PC 10B in an ongoing data session with the endpoint 22. The end goal here is to issue a higher-layer management session initiation command to the PC 10B from the RG 8. This can be done by establishing a management session with the RG 8 and causing the RG 8 to send a higher-layer management session initiation command to the PC 10B. Once the PC 10B receives the management session initiation command, it proceeds in the mariner previously described with reference to FIG. 6, namely, by obtaining a normal management address and transmitting it to the address server 20 along with its customer identifier. The difference in this case is that the normal management address will be assigned by the RG 8 (and not the BRAS 14).

A third possibility is that the PC 10B will not have any wake-up management address associated with it, although it will be known that the PC 10B is reachable via the RG 8. Here again, a management session is established with the RG 8 and the RG 8 is instructed to send a management session initiation command to the PC 10B. However, the management session initiation command in this particular case will be a lower-layer command, because the PC 10B does not have a wake-up management address.

Figure 7:
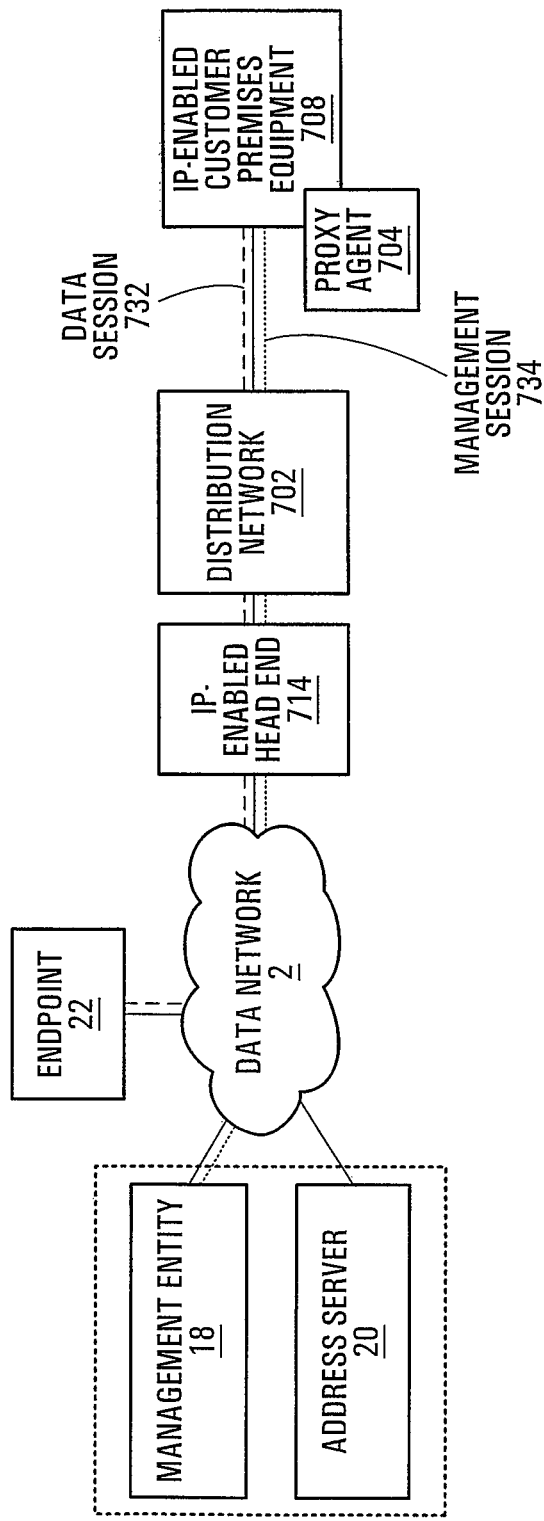
FIG. 7 depicts a management session between a management entity and a proxy agent residing in the customer premises device, in accordance with an alternative embodiment of the present invention.

It should be understood that the present invention is not limited to a DSL environment but rather can be used in a wide variety of other environments. For example, with reference to FIG. 7, consider the case of a generic communication system (e.g., cable or Internet), in which there is an IP-enabled head-end 714, connected to an IP-enabled customer premises equipment 708 by a distribution network 702. One of ordinary skill in the art will readily appreciate that a management session 734 between the management entity 18 and the IP-enabled customer premises equipment 708 can be triggered in a manner similar to that which has been described above, and separately from any data session 732 in which the IP-enabled customer premises equipment 708 might be participating. Specifically, the IP-enabled customer premises equipment 708 is capable of responding to a higher-layer management session initiation command to acquire a normal management IP address. Thus, a management session can be triggered using a higher-layer protocol without needing to resort to lower-layer techniques that might not be available over the distribution network 702.

In addition, those skilled in the art will readily recognize that further variations may be made in order to apply the teachings of the present invention in order to achieve improvement in conducting management sessions on an IP-enabled device in a wireless environment, such as city-wide WiFi (e.g., WiMax), EVDO, etc.

Those skilled in the art will appreciate that in some embodiments, the functionality of the proxy agents 204, the management entity 18 and the address server 20 may be implemented as pre-programmed hardware or firmware elements (e.g., application specific integrated circuits (ASICs), electrically erasable programmable read-only memories (EEPROMs), etc.), or other related components. In other embodiments, these entities may be implemented as an arithmetic and logic unit (ALU) having access to a code memory (not shown) which stores program instructions for the operation of the ALU. The program instructions could be stored on a medium which is fixed, tangible and readable directly by the proxy agents 204, the management entity 18 and the address server 20, (e.g., removable diskette, CD-ROM, ROM, or fixed disk), or the program instructions could be stored remotely but transmittable to these entities via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Also, it should be noted that although the management entity 18 and the address server 20 have been shown as separate functional entities, this is not to imply that a physical separation between these two entities is required. In fact, the management entity 18 and the address server 20 may be collocated and may even reside in the same machine as different parts of a common software program, for example.

While specific embodiments of the present invention have been described and illustrated, it will be apparent to those skilled in the art that numerous modifications and variations can be made without departing from the scope of the invention as defined in the appended claims.

What is claimed is:

1. A method for execution at a management entity, comprising:
   obtaining a management address for a customer device;
   consulting a database to determine whether the management address is of a normal type or a wake-up type;
   if the management address is of the normal type, conducting a management session with the customer device using the management address;
   if the management address is of the wake-up type, sending a command that causes the customer device to obtain a second management address that is of the normal type and conducting a management session with the customer device using the second management address.

2. The method defined in claim 1, wherein obtaining the management address for the customer device comprises querying an address server.

3. The method defined in claim 2, the customer device being a first customer device, wherein sending the command that causes the first customer device to obtain the second management address is effected through a second customer device associated with the first customer device.

4. The method defined in claim 1, the customer device being a first customer device, wherein sending a command that causes the first customer device to obtain the second management address is effected under a prior management session established with a second customer device connected between the management entity and the first customer device.

5. The method defined in claim 1, wherein the first management address is an address currently used by the customer device to support a session that is not a management session.

6. The method defined in claim 1, wherein the command is sent over layer 3 or higher of the OSI model.

7. Non-transitory computer readable storage media comprising computer-readable instructions for performing a method at a management entity, the method comprising:
   obtaining a management address for a customer device;
   consulting a database to determine whether the management address is of a normal type or a wake-up type;
   if the management address is of the normal type, conducting a management session with the customer device using the management address;
   if the management address is of the wake-up type, sending a command that causes the customer device to obtain a second management address that is of the normal type and conducting a management session with the customer device using the second management address that is of the normal type.

8. A system for establishing management sessions with customer devices, comprising:
   management entity hardware;
   an address server that maintains management addresses for respective ones of the customer devices;
   the management entity hardware querying the address server to obtain a first management address for a particular one of the customer devices;
   the management entity hardware determining whether the first management address is of a normal type or a wake-up type;
   the management entity hardware conducting a management session with the customer device using the first management address if the first management address is determined to be the normal type;
   the management entity hardware sending a command that causes the customer device to obtain a second management address that is of the normal type and conducting a management session with the customer device using the second management address, if the first management address is determined to be of the wake-up type.

9. The system defined in claim 8, wherein the first management address is an address currently used by the customer device to support a session that is not a management session.

10. The system defined in claim 8, wherein the command is sent over layer 3 or higher of the OSI model.

11. The system defined in claim 8, wherein the management entity hardware further conducts a management session with the particular customer device using the first management address.

* * * * *